United States Patent
Moosavi et al.

(10) Patent No.: US 12,063,530 B2
(45) Date of Patent: Aug. 13, 2024

(54) MEASUREMENT REPORTING TIMER

(71) Applicant: Telefonaktiebolaget LM Ericsson (publ), Stockholm (SE)

(72) Inventors: Reza Moosavi, Linköping (SE); Icaro L. J. Da Silva, Solna (SE); Fredrik Gunnarsson, Linköping (SE); Pradeepa Ramachandra, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 117 days.

(21) Appl. No.: 17/049,096

(22) PCT Filed: May 7, 2019

(86) PCT No.: PCT/IB2019/053748
§ 371 (c)(1),
(2) Date: Oct. 20, 2020

(87) PCT Pub. No.: WO2019/215619
PCT Pub. Date: Nov. 14, 2019

(65) Prior Publication Data
US 2021/0243624 A1 Aug. 5, 2021

Related U.S. Application Data

(60) Provisional application No. 62/667,993, filed on May 7, 2018.

(51) Int. Cl.
*H04W 24/08* (2009.01)
*H04W 24/10* (2009.01)
*H04W 36/00* (2009.01)

(52) U.S. Cl.
CPC .......... *H04W 24/08* (2013.01); *H04W 24/10* (2013.01); *H04W 36/0058* (2018.08); *H04W 36/0061* (2013.01); *H04W 36/0088* (2013.01)

(58) Field of Classification Search
USPC .......................................................... 370/252
See application file for complete search history.

(56) References Cited

U.S. PATENT DOCUMENTS

2014/0206341 A1* 7/2014 Siomina ............ H04W 36/0085
                                                          455/422.1
2015/0215825 A1    7/2015 Kim et al.
(Continued)

FOREIGN PATENT DOCUMENTS

CN        1997202 A      7/2007
CN      104219690 A     12/2017
(Continued)

OTHER PUBLICATIONS

ETSI TS 136 331 V13.0.0 (Jan. 2016), Technical Specification, LTE; Evolved Universal Terrestrial Radio Access (E-UTRA); Radio Resource Control (RRC); Protocol Specification (3GPP TS 36.331 version 13.0.0 Release 13) (Year: 2016).*
(Continued)

*Primary Examiner* — Gregory B Sefcheck
*Assistant Examiner* — Majid Esmaeilian
(74) *Attorney, Agent, or Firm* — Baker Botts L.L.P.

(57) ABSTRACT

According to certain embodiments, a method in a wireless device for measurement reporting comprises: receiving an instruction to perform measurement reporting for a neighbor cell: determining, based at least on a radio access technology (RAT) of the neighbor cell and a frequency range of the neighbor cell, a measurement reporting timer value for
(Continued)

performing the measurement reporting; and measuring a radio signal of the neighbor cell during the time specified by the determined measurement reporting timer value.

17 Claims, 15 Drawing Sheets

(56) References Cited

U.S. PATENT DOCUMENTS

| | | |
|---|---|---|
| 2015/0373694 A1 | 12/2015 | You et al. |
| 2016/0205717 A1* | 7/2016 | Kazmi .................. H04W 76/15 455/435.2 |
| 2016/0219475 A1* | 7/2016 | Kim ...................... H04W 76/15 |
| 2016/0353340 A1 | 12/2016 | Yang et al. |
| 2017/0202025 A1 | 7/2017 | Ouchi et al. |
| 2017/0251388 A1 | 8/2017 | Persson et al. |
| 2017/0359632 A1 | 12/2017 | Qu et al. |
| 2018/0035342 A1* | 2/2018 | Fujishiro ........... H04W 36/0085 |
| 2018/0049047 A1* | 2/2018 | Lin ...................... H04W 24/02 |
| 2018/0206140 A1* | 7/2018 | Panteleev ............ H04W 48/16 |
| 2018/0227972 A1* | 8/2018 | Tsuboi ................ H04W 74/004 |
| 2019/0191445 A1* | 6/2019 | Yamine .................. H04B 1/713 |
| 2019/0274177 A1* | 9/2019 | Kuge .................... H04W 48/12 |
| 2019/0391195 A1* | 12/2019 | Kvarnstrand .......... H04B 17/15 |
| 2021/0153083 A1* | 5/2021 | Moosavi ............... H04W 24/10 |

FOREIGN PATENT DOCUMENTS

| | | |
|---|---|---|
| CN | 107493589 A | 12/2017 |
| CN | 103181209 A | 8/2019 |
| EP | 2 887 741 A1 | 6/2015 |
| EP | 3 282 632 A1 | 2/2018 |
| JP | 2021-519020 A | 8/2021 |
| KR | 20140002904 A | 1/2014 |
| RU | 2 503 145 C2 | 12/2013 |
| WO | 2010 113407 A1 | 10/2010 |
| WO | 2016 133122 A1 | 8/2016 |
| WO | 2017 026415 A1 | 2/2017 |
| WO | 2019 184760 A1 | 10/2019 |

OTHER PUBLICATIONS

3GPP TSG-RAN WG2 Meeting #101bis; Sanya, China; Source: vivo; Title: ANR for EN-DC and NR Standalone (R2-1804595)—Apr. 16-20, 2017.
3GPP TSG-RAN WG2#101bis; Sanya, China; Source: LG Electronics Inc.; Title: Compromised solution of measurement report for aerial UE (R2-1805771)—Apr. 16, 20, 2018.
PCT Internatonal Search Report issued for International application No. PCT/IB2019/053748—May 7, 2019.
PCT Written Opinion of the International Searching Authority for International application No. PCT/IB2019/053748—May 7, 2019.
Decision To Grant issued by the ROSPATENT, Federal Service for Intellectual Property for Application No. 2020134603—Sep. 17, 2021.
Notice of Reasons for Rejection issued for Japanese Application Patent No. 2020-562642—Jan. 21, 2022.
3GPP TSG-RAN WG4 Meeting #88; Gothenburg, Sweden; Source: MediaTek Inc.; Title: Discussion on CGI reading requirement for Nr (R4-1810015)—Aug. 20-24, 2018.
Examination Report issued by Intellectual Property India for Application No. 202017041765—Aug. 19, 2022.
3GPP TSG-RAN WG2 NR #101; Athens, Greece, Feb. 26-Mar. 2, 2018; Agenda Item: 10.4.1.4.5; Source: Ericsson; Title: Configuration of CGI Reporting (Tdoc R2-1803333 (Resubmission of R2-1801310)).
Extended European Search Report issued for Application No./Patent No. 23175624.8-1216 / 4243485—Oct. 26, 2023.
3GPP TS 36.331 V13.9.1 (Apr. 2018); 3rd Generation Partnership Project; Technical Specification Group Radio Access Network; Evolved Universal Terrestrial Radio Access (E-UTRA); Radio Resource Control (RRC); Protocol specification (Release 13).
Chinese Office Action issued for Application No. 201980030322. 1—Aug. 24, 2023.

\* cited by examiner

MEASUREMENT REPORTING TIMER

PRIORITY

This nonprovisional application is a U.S. National Stage Filing under 35 U.S.C. § 371 of International Patent Application Serial No. PCT/IB2019/053748 filed May 17, 2019 and entitled "Measurement Reporting Timer" which claims priority to U.S. Provisional Patent Application No. 62/667,993 filed May 7, 2018 both of which are hereby incorporated by reference in their entirety.

TECHNICAL FIELD

Embodiments of the present disclosure are directed to wireless communications and, more particularly, to variable length timers for reporting radio measurement results.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Third Generation Partnership Project (3GPP) long term evolution (LTE) includes automatic neighbor relation (ANR), which automatically determines relationships between network nodes, such as eNBs. The relations may be used for various purposes, such as establishing connections between eNBs, supporting mobility, load balancing, dual connectivity, etc. Thus, ANR may significantly reduce planning and operation costs for operators.

In LTE, a user equipment (UE) detects cells based on their primary/secondary synchronization signals (PSS/SSS), which encode a physical cell identifier (PCI). An important property of the synchronization signals is that the UE autonomously detects neighbor cell IDs from an acquired PSS/SSS (i.e., the network does not need to provide a neighbor cell list). UEs typically detect and measure neighbor cells by sampling a short time window (e.g., 5 ms) on the frequency of the neighbor (which may be the same or different frequency from the serving cell) and search (possibly offline) for PSS/SSS occurrences within that sample. For each detected PSS/SSS, the UE may perform a measurement using a cell reference signal (CRS) corresponding to the PCI. The result is a list of neighbor cell identities and corresponding measurement samples.

After the UE performs measurements, mobility events can trigger the transmission of measurement reports. Based on these reports, the serving eNB identifies that a given PCI belongs to a neighbor eNB and may trigger a handover preparation procedure. The serving eNB maintains a neighbor relation table (NRT) that maps locally unique identifiers (e.g., the PCIs in LTE) with globally unique identifiers (e.g., the E-UTRAN cell global identifier (E-CGI)). LTE defines E-CGI as a combination of public land mobile network (PLMN) ID (combination of country code and network code) and enhanced cell identity (ECI) (combination of eNB ID and cell ID).

Given the benefits of ANR in LTE, ANR will continue to be an important feature in next generation radio system (NR). Challenging NR requirements may result in a greater emphasis on the need for seamless mobility than in legacy radio access technologies (RATs), which further increases the importance of automatic relation establishment in NR. NR supports ANR using LTE procedures as a baseline, and the LTE inter-RAT ANR framework is extended for NR.

ANR reporting includes cell global identifier (CGI) reporting. The UE is requested to read neighbor cells system information (including global cell identity) to assist an eNB/gNB in building neighbor relation information. CGI measurement is normally requested when the UE has reported an unknown PCI (i.e., an unknown neighbor cell) to the source node managing the connection. PCI information is included in all the UE measurement reports which may have been initiated for different purposes. When the eNB/gNB has required information about a neighbor cell, the information is stored and may be used to setup an X2/Xn connection between the nodes. As described above, the X2/Xn connection may be used for several different procedures, such as handover, dual connectivity setup, etc.

FIG. 1 is a block diagram illustrating an example of dual connectivity and neighbor node CGI retrieval. UE 10 may be connected to a master node (MN) 20, and optionally connected to one or more secondary nodes (SN) 30 for dual/multiple connectivity. UE 10 may retrieve the CGI of a neighbor node (NN) 40.

In LTE, upon receiving a measurement configuration including a reportConfig information element with its purpose set to reportCGI, the UE starts a timer referred to as T321 and tries to acquire CGI information of the requested cell. If the UE succeeds while the timer is running, the UE includes CGI information in a reportCGI message (which is an example of a measurement report) and sends the message to the network. If the UE fails to detect the CGI info within the duration of T321 (i.e., upon the expiry of T321), the UE sends a reportCGI message with an empty CGI information field. In LTE, T321 is pre-configured in the specification 3GPP TS 36.331.

In LTE, the value of T321 is set differently for intra-RAT ANR and inter-RAT ANR. If the ANR measurement is associated with intra-RAT ANR, T321 is set with a shorter time value, because the UE has previously been connected to the RAT.

Further, in existing LTE, if the UE is able to use autonomous gaps in acquiring system information from a neighbor cell (i.e., si-RequestForHO is included in the reportConfig), then the UE may use a shorter time value for T321.

The following is an excerpt from TS 36.331 version 15.1.0.

```
2> if the triggerType is set to periodical and the purpose is set to reportCGI in the
reportConfig associated with this measId:
    3> if the measObject associated with this measId concerns E-UTRA:
        4> if the si-RequestForHO is included in the reportConfig associated with
this measId:
            5> if the UE is a category 0 UE according to 3GPP TS 36.306:
                6> start timer T321 with the timer value set to 190 ms for this
measId;
            5> else:
                6> start timer T321 with the timer value set to 150 ms for this
measId;
        4> else:
            5> start timer T321 with the timer value set to 1 second for this measId;
    3> else if the measObject associated with this measId concerns UTRA:
        4> if the si-RequestForHO is included in the reportConfig associated with
this measId:
            5> for UTRA FDD, start timer T321 with the timer value set to 2 seconds
for this measId;
            5> for UTRA TDD, start timer T321 with the timer value set to 1 second
for this measId;
        4> else:
            5> start timer T321 with the timer value set to 8 seconds for this measId;
    3> else:
        4> start timer T321 with the timer value set to 8 seconds for this measId
```

NR includes various deployment scenarios. For example, multiple variations exist for deploying a 5G network with or without interworking with existing LTE and evolved packet code (EPC). Some options are illustrated in FIG. 2.

FIG. 2 is a block diagram illustrating various LTE and NR interworking options. Option 3 illustrated in FIG. 2 may be referred to as EN-DC (EUTRAN-NR Dual Connectivity). In the illustrated network deployment, dual connectivity is used between NR and LTE where a master node is LTE and a secondary node is NR. The RAN node (gNB) supporting NR may not have a control plane connection to the core network (EPC). Instead, the gNB may rely on the LTE as master node (MeNB). This may be referred to as non-standalone (NSA) NR and 5GCN is not included in this deployment. In the illustrated example, the functionality of an NR cell is limited to use by connected mode UEs as a booster and/or diversity leg, but a UE cannot camp on the NR cells.

Using 5G core network (5GCN), other options are available. For example, illustrated option 2 supports stand-alone (SA) NR deployment where the gNB is connected to 5GCN. Similarly, LTE can also be connected to 5GCN using illustrated option 5. In these examples, both NR and LTE are part of the NG-RAN and connected to 5GCN.

LTE networks include system information divided into a master information block (MIB) and a number of system information blocks (SIBs). The MIB includes a limited number of most essential and most frequently transmitted parameters that are needed to acquire other information from the cell and is transmitted on a broadcast channel (BCH).

In particular, the information needed for ANR, such as CGI, tracking area code (TAC) and PLMN list, is broadcasted in system information block type 1 (SIB1). Because NR can be deployed along with LTE (more precisely as EN-DC described above), an NR cell may skip SIB1 transmission. To assist a UEs in recognizing the absence of a SIB1 transmission, absence information is broadcasted in the MIB. More precisely, the pdcch-ConfigSIB1 information element (IE) is mandatory in MIB1 and one code-point (e.g., all-zeros) is assigned if SIB1 is not present. The UE, by decoding the MIB content, determines whether to expect SIB1 transmission.

NR may be deployed in low frequency ranges as well as high frequency ranges. 3GPP Rel 15 NR (38.104, section 5.2) describes support in two frequency ranges, FR1 (450 MHz-6 GHz) and FR2 (24.25 GHz-52.6 GHz).

SUMMARY

Based on the description above, there currently exist certain challenges for measurement reporting timer selection. For example, the T321 timer is pre-configured in Third Generation Partnership Project (3GPP) long term evolution (LTE). T321 is different for different cells for which to report CGI and possibly different depending on UE category. T321 also depends on whether the UE may use autonomous gaps. The T321 timer provides the UE with time for frequency tuning and retuning back to the serving carrier and radio access technology (RAT) in case the reporting includes a cell at a different frequency and/or RAT.

Fifth generation (5G) new radio (NR), however, includes a diverse range of deployments and new use cases. These include, for example, inter-RAT Dual Connectivity between LTE and NR (referred to as EN-DC when LTE is connected to the evolved packet core (EPC), but also comprising other options such as NR as an anchor and LTE as booster or, LTE as booster but connected to 5GC). These make the current solution non-suitable.

For example, when a UE is configured for dual connectivity with two active transceivers, then the required time for cell global identifier (CGI) reporting may depend on which transceiver the UE will use for CGI retrieval. This is not defined in the current specification. Setting an overly conservative timer may lead to an unnecessarily long wait for its expiry when a UE is having a problem acquiring the CGI. This may be a likely event in NR because NR may include Non-Standalone (NSA) cells not broadcasting SIB1 (i.e., not broadcasting CGI).

Another example includes NR synchronization signal blocks (SSBs) where the associated system information transmitting the CGI is in a different frequency. Because this scenario can have a multitude of flavors, fixing a time appropriate for all cases without being too conservative is difficult.

NR does not currently specify a solution for the CGI reporting problems described above, and nothing specific regarding the timer T321. LTE specifies the following values depending on different conditions.

For EUTRA frequencies, if the si-RequestForHO information element is included (when the field is included, the UE is allowed to use autonomous gaps in acquiring system information from the neighbor cell, applies a different value for T321, and includes different fields in the measurement report), then a Category 0 UE uses a T321 timer value of 190 ms and all other UEs use a value of 150 ms. If si-RequestForHO is not included, then frequency division duplex (FDD) UEs use a T321 timer value of 1 second and time division duplex (TDD) UEs use a value of 2 seconds.

For UTRA frequencies, if the si-RequestForHO information element is included, then a Category 0 UE uses a T321 timer value of 190 ms and all other UEs use a value of 150 ms. If si-RequestForHO is not included, then all UEs use a value of 8 seconds. For any other cases not specified above, the T321 timer value is 8 seconds.

Certain aspects of the present disclosure and their embodiments may provide solutions to these or other challenges. Particular embodiments address measurement reporting timer selection (e.g., T321) for neighbor node CGI retrieval depending on different criteria known by the network (e.g., duration for CGI acquisition based on frequency range of neighbor cell, RAT of neighbor cell, selected transceiver, etc.). In some embodiments, one criterion is the current UE transceiver configuration when the UE supports dual or multiple connectivity with a master node and one or more secondary nodes.

According to some embodiments, a method performed by a wireless device for measurement reporting comprises: receiving an instruction to perform measurement reporting for a neighbor cell: determining, based at least on a RAT of the neighbor cell and a frequency range of the neighbor cell, a measurement reporting timer value for performing the measurement reporting: and measuring a radio signal of the neighbor cell during the time specified by the determined measurement reporting timer value.

In particular embodiments, the measurement reporting comprises a CGI report. The neighbor cell RAT may be 5G NR.

In particular embodiments, determining the measurement reporting timer value comprises determining both a first measurement reporting timer value for a neighbor cell operating at a first frequency range and a second measurement reporting timer value for a neighbor cell operating at a second frequency range. The first frequency range may comprise a 450 Megahertz to 6 Gigahertz range, the value of the first measurement reporting timer may be 2 seconds, the second frequency range may comprise a 24.25 Gigahertz to 52.6 Gigahertz range, and the value of the second measurement reporting timer may be 16 seconds.

In particular embodiments, the wireless device comprises two or more transceivers. The method further comprises selecting one of the two or more transceivers for performing the measurement reporting. Determining the measurement reporting timer value is further based on the selected transceiver. Determining the measurement reporting timer value based on the selected transceiver may comprise determining the measurement reporting timer value based on a frequency range of the selected transceiver or on a RAT of the selected transceiver.

According to some embodiments, a wireless device is capable of measurement reporting. The wireless device comprises processing circuitry operable to: receive an indication to perform measurement reporting for a neighbor cell: determine, based at least on a RAT of the neighbor cell and a frequency range of the neighbor cell, a measurement reporting timer value for performing the measurement reporting: and measure a radio signal of the neighbor cell during the time specified by the determined measurement reporting timer value.

In particular embodiments, the measurement reporting comprises a CGI report. The neighbor cell RAT is may be 5G NR.

In particular embodiments, the processing circuitry is operable to determine the measurement reporting timer value by determining both a first measurement reporting timer value for a neighbor cell operating at a first frequency range and a second measurement reporting timer value for a neighbor cell operating at a second frequency range. The first frequency range may comprise a 450 Megahertz to 6 Gigahertz range, the value of the first measurement reporting timer may be 2 seconds, the second frequency range may comprise a 24.25 Gigahertz to 52.6 Gigahertz range, and the value of the second measurement reporting timer may be 16 seconds.

In particular embodiments, the wireless device comprises two or more transceivers. The processing circuitry is further operable to select one of the two or more transceivers for performing the measurement reporting. The processing circuitry determines the measurement reporting timer value further based on the selected transceiver. The processing circuitry may be operable to determine the measurement reporting timer value based on the selected transceiver by determining the measurement reporting timer value based on a frequency range of the selected transceiver or a RAT of the selected transceiver.

According to some embodiments, a method for use in a network node for measurement reporting comprises: determining, based at least on a RAT of a neighbor cell and a frequency range of the neighbor cell, a measurement reporting timer value for a wireless device to perform measurement reporting: and transmitting the determined measurement reporting timer value to the wireless device.

In particular embodiments, the measurement reporting comprises a CGI report. The neighbor cell RAT may be 5G NR.

In particular embodiments, determining the measurement reporting timer value comprises determining both a first measurement reporting timer value for a neighbor cell operating at a first frequency range and a second measurement reporting timer value for a neighbor cell operating at a second frequency range. The first frequency range may comprise a 450 Megahertz to 6 Gigahertz range, the value of the first measurement reporting timer may be 2 seconds, the second frequency range may comprise a 24.25 Gigahertz to 52.6 Gigahertz range, and the value of the second measurement reporting timer may be 16 seconds.

In particular embodiments, the wireless device comprises two or more transceivers. The method further comprises selecting one of the two or more transceivers for performing the measurement reporting. Determining the measurement reporting timer value is further based on the selected transceiver. Determining the measurement reporting timer value based on the selected transceiver may comprise determining the measurement reporting timer value based on a frequency range of the selected transceiver or on a RAT of the selected transceiver.

According to some embodiments, a network node is capable of measurement reporting. The network node comprises processing circuitry operable to: determine, based at least on a RAT of a neighbor cell and a frequency range of the neighbor cell, a measurement reporting timer value for a wireless device to perform measurement reporting: and transmit the determined measurement reporting timer value to the wireless device.

In particular embodiments, the measurement reporting comprises a CGI report. The neighbor cell RAT may be 5G NR.

In particular embodiments, the processing circuitry is operable to determine the measurement reporting timer value by determining both a first measurement reporting timer value for a neighbor cell operating at a first frequency range and a second measurement reporting timer value for a neighbor cell operating at a second frequency range. The first frequency range may comprise a 450 Megahertz to 6 Gigahertz range, the value of the first measurement reporting timer may be 2 seconds, the second frequency range may comprise a 24.25 Gigahertz to 52.6 Gigahertz range, and the value of the second measurement reporting timer may be 16 seconds.

In particular embodiments, the wireless device comprises two or more transceivers, the processing circuitry is operable to determine the measurement reporting timer value further based on a selected transceiver of the two or more transceivers, and the processing circuitry is further operable to transmit an indication of the selected receiver to the wireless device. The processing circuitry may be operable to determine the measurement reporting timer value based on the selected transceiver by determining the measurement reporting timer value based on a frequency range of the selected transceiver or a RAT of the selected transceiver.

According to some embodiments, a wireless device is capable of measurement reporting. The wireless device comprises a receiving module, a determining module, and a measuring module. The receiving module is operable to receive an instruction to perform measurement reporting for a neighbor cell. The determining module is operable to determine, based at least on a RAT of the neighbor cell and a frequency range of the neighbor cell, a measurement reporting timer value for performing the measurement reporting. The measuring module is operable to measure a radio signal of the neighbor cell during the time specified by the determined measurement reporting timer value.

According to some embodiments, a network node is capable of measurement reporting. The network node comprises a determining module and a transmitting module. The determining module is operable to determine, based at least on a RAT of a neighbor cell and a frequency range of the neighbor cell, a measurement reporting timer value for a wireless device to perform measurement reporting. The transmitting module is operable to transmit the determined measurement reporting timer value to the wireless device.

Also disclosed is a computer program product comprising a non-transitory computer readable medium storing computer readable program code, the computer readable program code operable, when executed by processing circuitry to perform any of the methods performed by the network node described above.

Another computer program product comprises a non-transitory computer readable medium storing computer readable program code, the computer readable program code operable, when executed by processing circuitry to perform any of the methods performed by the wireless device described above.

Certain embodiments may provide one or more of the following technical advantages. Particular embodiments optimize timer value selection (e.g., T321) for cases when a UE is connected to more than one node. The UE has freedom to select the most appropriate transceiver for CGI retrieval.

In some embodiments, a UE may receive transceiver selection indication control from the network. The UE may report the T321 timer value for the selected case to the network.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
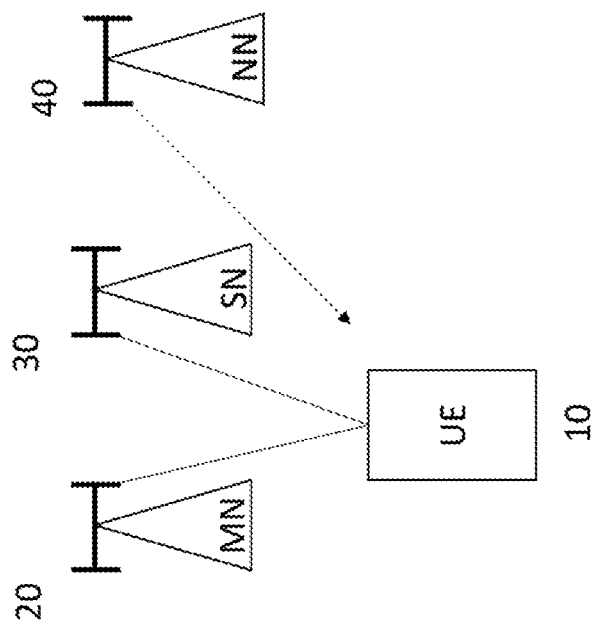
FIG. 1 is a block diagram illustrating an example of dual connectivity and neighbor node CGI retrieval.
Figure 2:
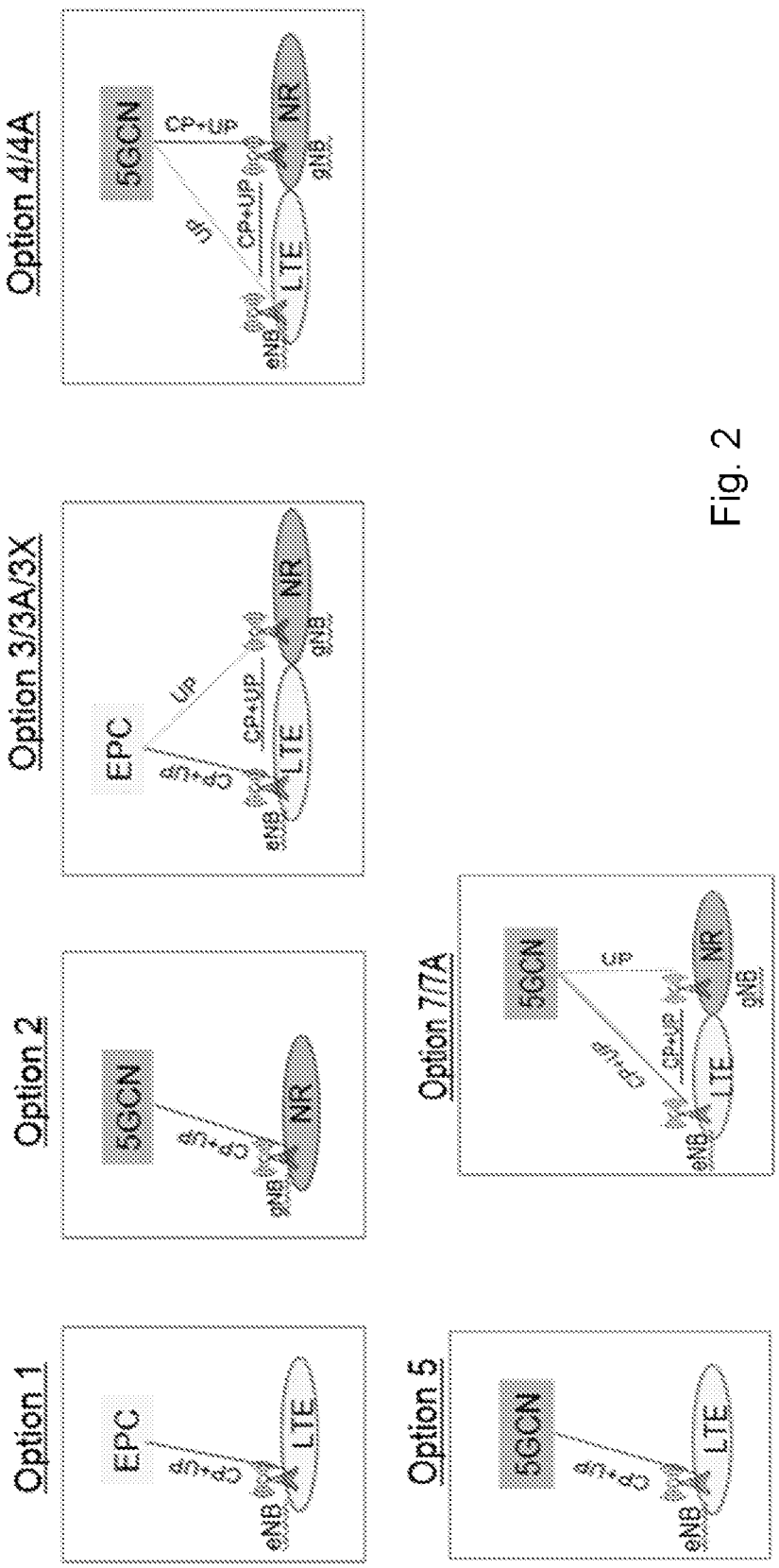
FIG. 2 is a block diagram illustrating various LTE and NR interworking options.

Based on the description above, there currently exist certain challenges for measurement reporting timer selection in fifth generation (5G) new radio (NR). For example, the T321 timer is pre-configured in Third Generation Partnership Project (3GPP) long term evolution (LTE). The pre-configured value may vary for different cells, for different UE categories, whether the UE may use autonomous gaps, etc. 5G NR, however, includes a diverse range of deployments and new use cases that make the current solution non-suitable. NR does not currently specify a solution for the timer selection problems described above.

Certain aspects of the present disclosure and their embodiments may provide solutions to these or other challenges. Particular embodiments address measurement reporting timer selection (e.g., T321) for neighbor node cell global identifier (CGI) retrieval depending on different criteria known by the network (e.g., duration for CGI acquisition based on frequency range of neighbor cell, radio access technology (RAT) of neighbor cell, selected transceiver, etc.).

Certain aspects of the present disclosure and their embodiments may provide solutions to these or other challenges. Particular embodiments optimize timer value selection (e.g., T321) for cases when a UE is connected to more than one node. The UE has freedom to select the most appropriate transceiver for CGI retrieval. In some embodiments, a UE may receive transceiver selection indication control from the network. The UE may report the selected timer value to the network.

Particular embodiments are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

CGI reporting capabilities may depend on the configured RAT and/or frequency carrier(s) of the serving cell and the RAT and/or frequency carrier of a neighbor node. Particular embodiments apply to dual or multiple connectivity UEs.

Measurement reporting T321 timer values are pre-configured in LTE. A specification defines different T321 timer values for different circumstances. The circumstances differ in terms of the neighbor node RAT and whether the UE may use autonomous gaps where the UE disregards transmitted data and/or configured uplink resources to retrieve CGI.

In some embodiments, the pre-configured T321 timer values include the transceiver configuration of the UE. The T321 timer value may depend on the RAT of the selected transceiver for CGI retrieval. For example, a shorter T321 timer value may be configured if the RAT of the selected transceiver for CGI retrieval is the same as the RAT of the neighbor node.

In some embodiments, the T321 timer value depends on the frequency range of the neighbor node. For example, if the neighbor node is NR, then the T321 timer value may depend on whether the neighbor node is operating in FR1 or FR2. As a particular example, the UE may select a timer value of 2 seconds for FR1 and 16 seconds for FR2.

In some embodiments, the T321 timer value depends on the combination of the frequency range of the selected transceiver for CGI retrieval and the frequency range of the neighbor node. For example, in some configurations the selected transceiver for CGI retrieval may be in NR FR1 or FR2 and the frequency range of the neighbor node is operating in FR1 or FR2. Another example is a configuration where the selected transceiver for CGI retrieval may be in LTE and the frequency range of the neighbor node is operating in FR1 or FR2. Another configuration includes the selected transceiver for CGI retrieval may be in NR FR1 or FR2 and the neighbor node is operating in LTE.

In some embodiments, the UE is configured by a connected node (e.g., master gNB, secondary gNB, etc.) with T321 timer values. The configured values may comprise case-based values.

Some embodiments define a UE category based on its transceiver architecture (i.e., a shorter timer is defined for UEs capable of processing CGI faster because they have dual transceiver architecture).

In some embodiments, a UE is configured with two or more transceivers. The UE can select which transceiver to use for CGI retrieval.

In particular embodiments, the selection depends on the frequency range of the transceivers and the RAT of the neighbor node. As one example, a UE may be configured with a transceiver in FR1 and a transceiver in FR2, and the neighbor node is operating in FR1. The UE may select a transceiver in FR1 for CGI retrieval in case only an FR1 configured transceiver can be used to retrieve CGI from a neighbor node operating in FR1.

In another example, the UE is configured with a transceiver in FR1 and a transceiver in FR2, and the neighbor node is operating in FR2. The UE may select a transceiver in FR2 for CGI retrieval in case only an FR2 configured transceiver can be used to retrieve CGI from a neighbor node operating in FR2.

In another example, the UE is configured with a transceiver in FR1 connected via LTE and a transceiver in FR2, and the neighbor node is operating in FR1. The UE may select a transceiver in FR1 for CGI retrieval in case only an FR1 configured transceiver can be used to retrieve CGI from a neighbor node operating in FR1.

In yet another example, the UE is configured with a transceiver in FR1 connected via LTE and a transceiver in FR1 connected via NR, and the neighbor node is operating in FR1. The UE may select either of the transceivers in case only an FR1 configured transceiver can be used to retrieve CGI from a neighbor node operating in FR1. An example of a particular embodiments is illustrated in FIG. 3.

Figure 3:
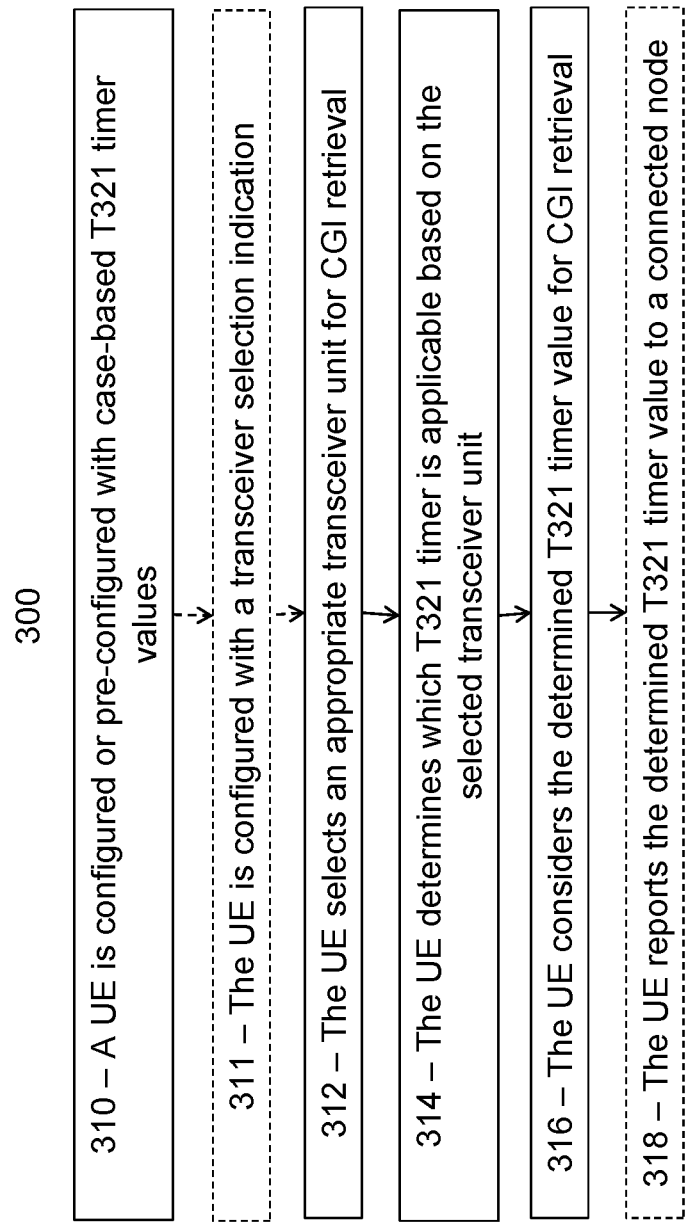
FIG. 3 is a flow diagram illustrating an example method in a wireless device.

FIG. 3 is a flow diagram illustrating an example method in a wireless device. At step 310, the UE is pre-configured or optionally configured with one or more T321 timer values. The one or more values may depend on the RAT of the neighbor node. The one or more values may also depend on the transceiver configuration of the UE. The values may be referred to as case-based.

In some embodiments, the method may include step 311 where the UE receives a transceiver selection indication. For example, the UE may receive an indication of which transmitter to use for CGI retrieval from a network node, such as a master gNB or a secondary gNB.

In particular embodiments, the indication specifies that the UE shall select a transceiver configured to operate in the same frequency range and/or the same RAT as the neighbor node. The indication may specify that the UE can autonomously select the transceiver for CGI retrieval.

At step 312, the UE selects an appropriate transceiver for CGI retrieval. This can be based on the transceivers that are in use, based on which of the transceivers in use are most appropriate for CGI retrieval of the neighbor node, or based on any other suitable criteria.

At step 314, the UE determines an applicable T321 time value based on the selected transceiver and the pre-configured or configured case-based T321 timer values. At step 316, the UE considers the determined T321 time value when initiating and conducting CGI retrieval from the neighbor node.

In some embodiments, based on the transceiver selection and the one or more case-based T321 timer values, the UE determines the T321 timer value and initiates the timer when the UE obtains the CGI reporting request. While the timer is running, the UE tries to retrieve the CGI from the neighbor node and then responds to the neighbor node. If the T321 timer expires, the UE responds with an empty CGI report.

In some embodiments, the method may include step 318 where the UE reports the determined T321 timer value to a connected node, such as a base station (e.g., master node, secondary node, etc.). In general, particular embodiments include a case-based T321 timer value determination for CGI retrieval based on the selected transceiver and neighbor node configuration.

Figure 4:
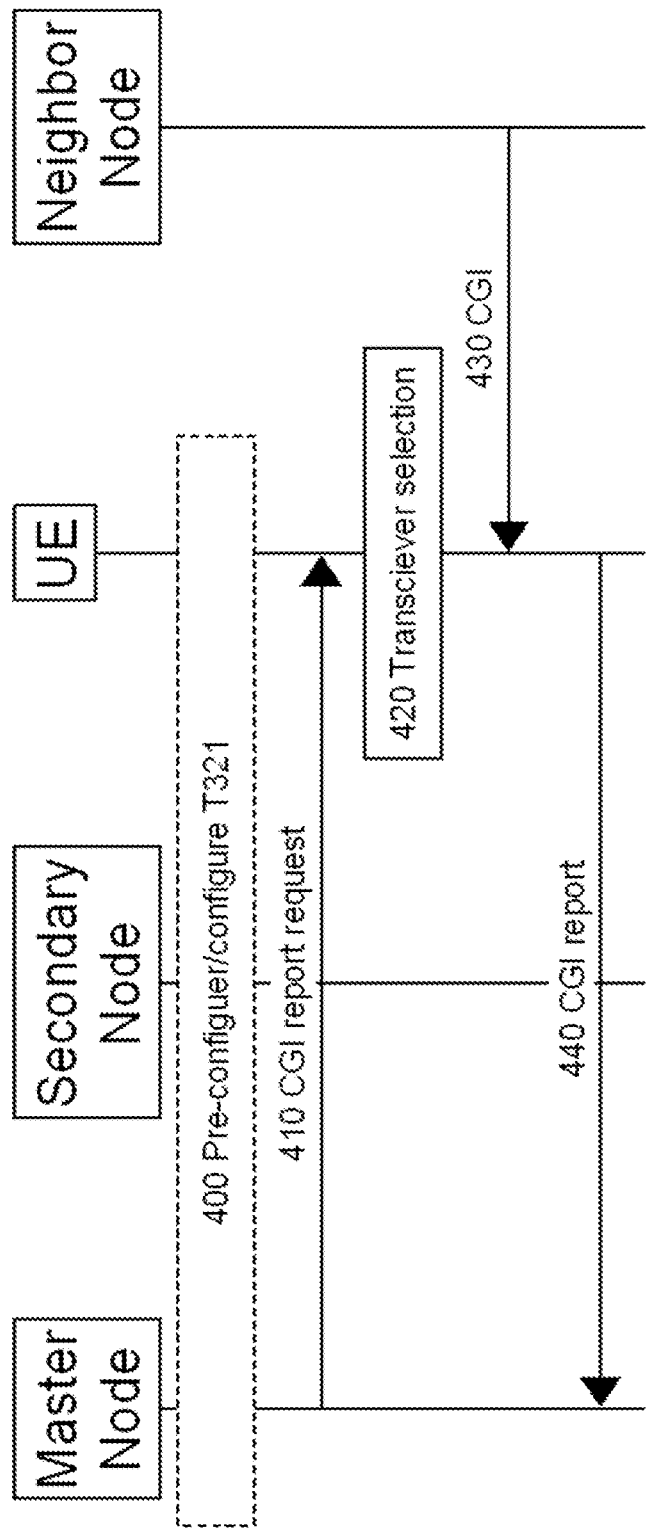
FIG. 4 is a flow diagram illustrating signaling, according to particular embodiments.

FIG. 4 is a flow diagram illustrating signaling, according to particular embodiments. At step 400, case-based T321 timer values are pre-configured or optionally configured by a connected node (e.g., master node or secondary node). At step 410, the master node or a secondary node sends a CGI request to the UE. The request is typically triggered by the UE reporting a physical cell identifier (PCI) of a neighbor node, and the PCI is either not known by a connected node or considered ambiguous.

At step 420, the UE selects an appropriate transceiver for the CGI retrieval. At step 430 the UE retrieves the CGI from the neighbor node and at step 440 reports the CGI to a connected node (e.g., master node or secondary node).

Figure 5:
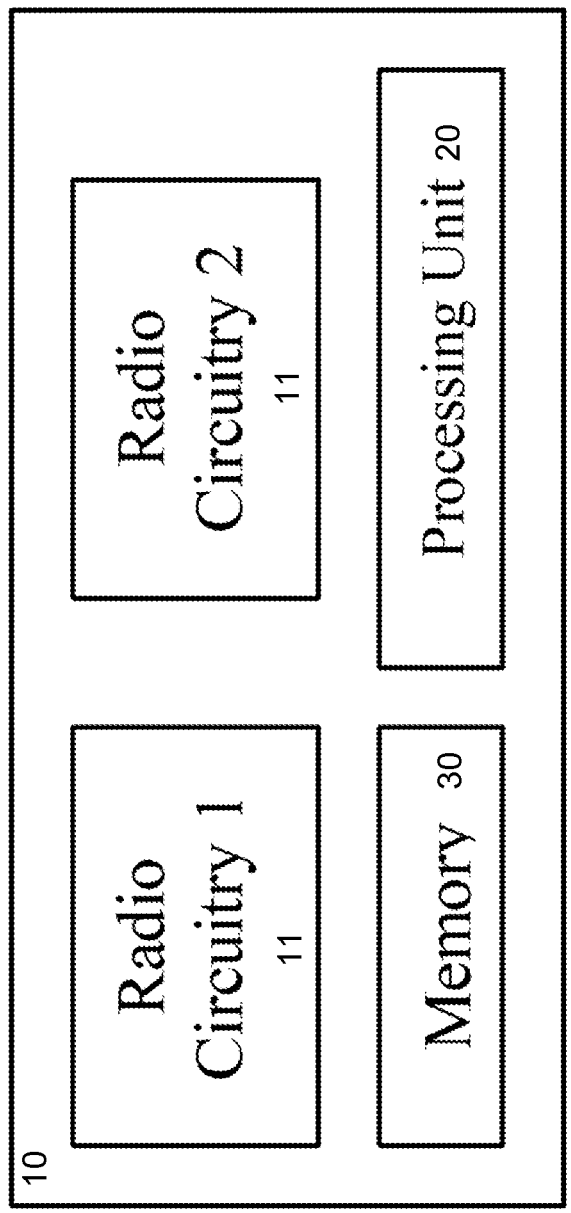
FIG. 5 is a block diagram illustrating an example wireless device, according to particular embodiments.

FIG. 5 is a block diagram illustrating an example wireless device, according to particular embodiments. Wireless device 10 (e.g., UE) includes two or more radio front ends 11, processing circuitry 20, and memory 30. Wireless device 10 is similar to wireless device 110 described in more detail with respect to FIG. 6. Radio front ends 11, processing circuitry 20 and memory 30 are similar to radio front end 111, processing circuitry 120, and memory 130, respectively, described in more detail with respect to FIG. 6.

In NR, PCI is encoded in Synchronization Sequence Blocks (SSBs). LTE includes system information associated to the PCI where the UE can obtain CGI, if configured. NR includes some different deployments where SSBs may not be multiplexed with its associated system information. In other words, a UE may need to re-tune its transceiver to acquire CGI associated to a PCI the UE has been configured with, which is different from LTE, and may need a longer timer to acquire CGI. Accordingly, an NR UE may benefit from being configured with longer T321 values.

Another scenario in NR that my need longer times to acquire CGI is when the UE is configured to acquire multiple CGIs. In NR the network may configure the UE with a list of PCIs (or a measurement object) from which it shall acquire and report multiple CGIs, which may take longer than in LTE (even for intra-RAT case) which benefits from having longer T321 timer values.

Another scenario in NR that my lead to longer times to acquire CGI is when a UE needs to perform on demand system information. In other words, a given PCI may not be transmitting CGI and the UE needs to require system information, which would require an additional radio round trip time.

Figure 6:
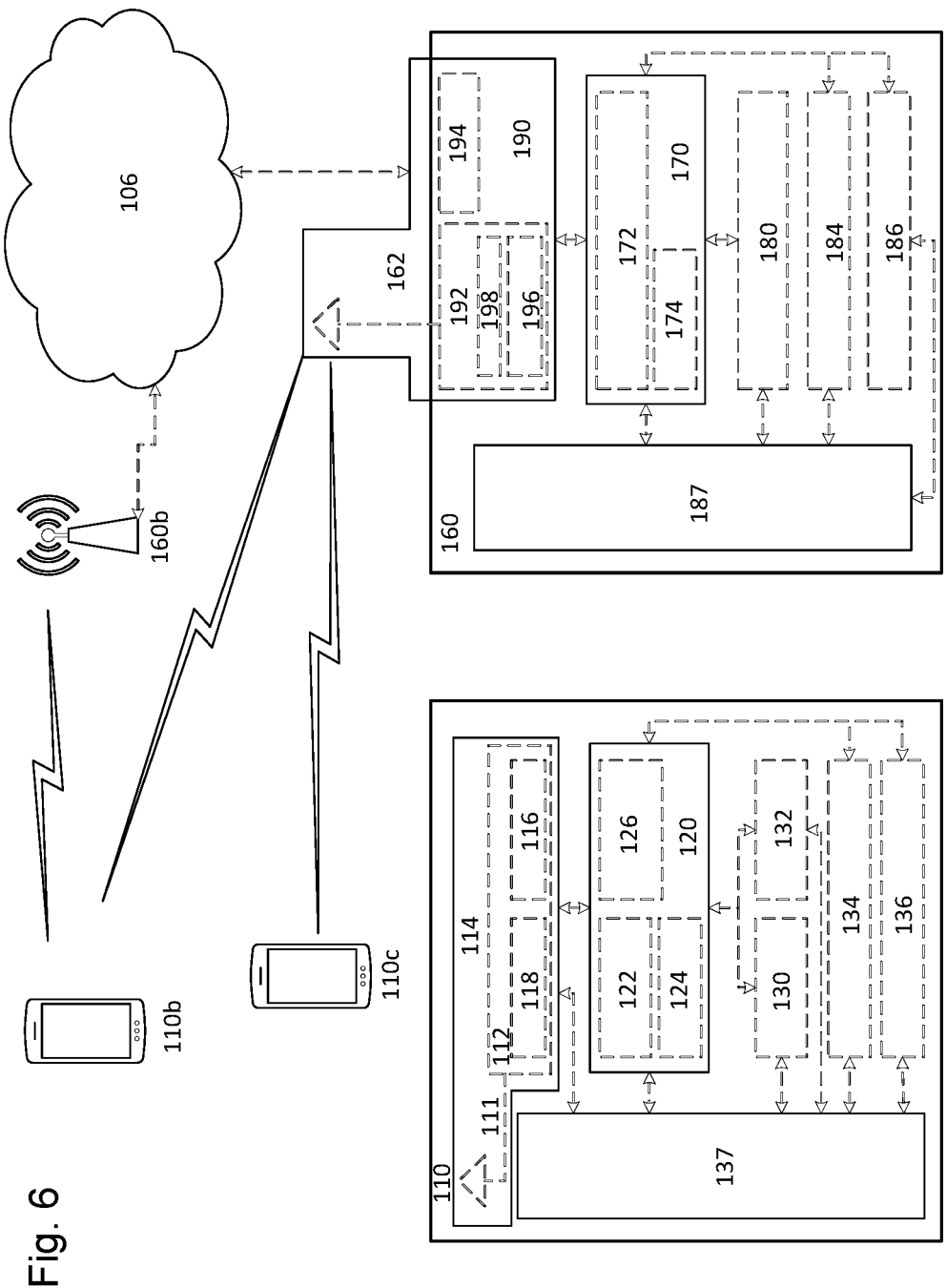
FIG. 6 is a block diagram illustrating an example wireless network.

FIG. 6 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards: wireless local area network (WLAN) standards, such as the IEEE 802.11 standards: and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. The operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IOT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IOT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112: rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen: if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source: in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 7:
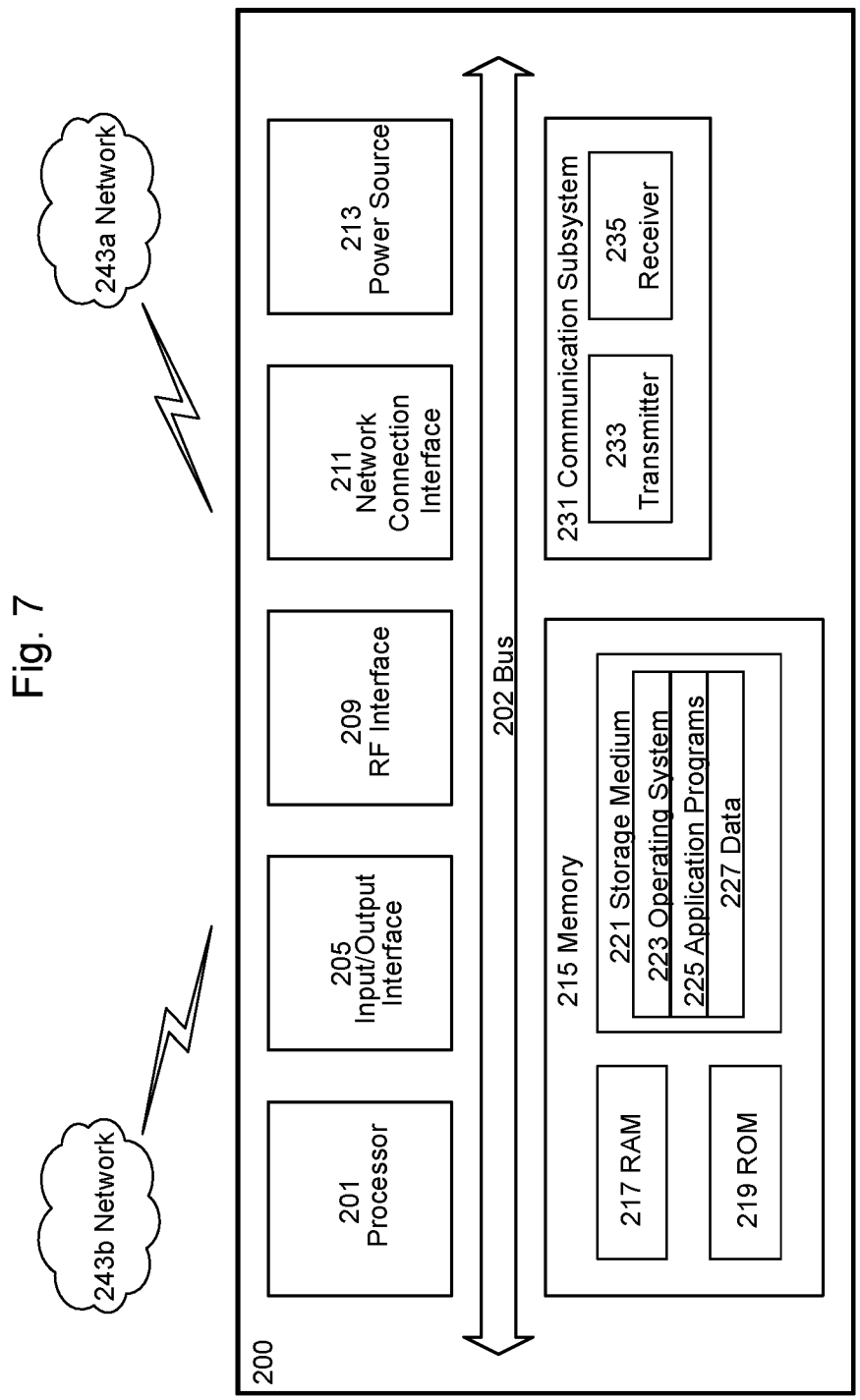
FIG. 7 illustrates an example user equipment, according to certain embodiments.

FIG. 7 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IOT UE, a machine type communication (MTC) UE, and/or an enhanced MTC (eMTC) UE. UE 200, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software: or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
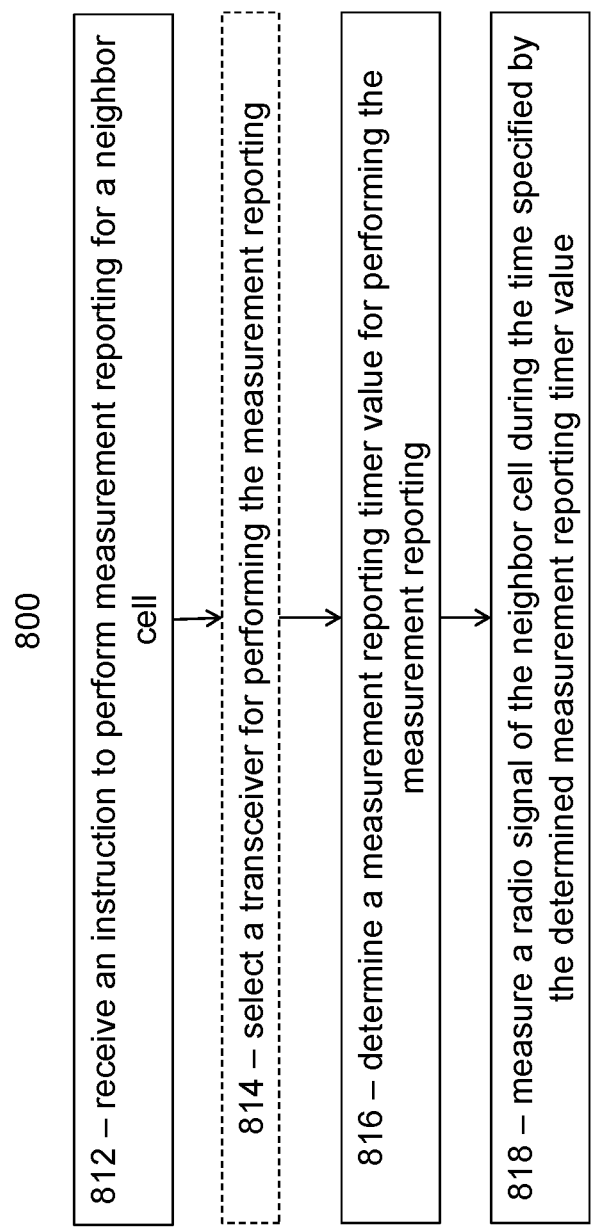
FIG. 8 is a flowchart illustrating an example method in a wireless device for measurement reporting, according to certain embodiments.

FIG. 8 is a flowchart illustrating an example method in a wireless device for measurement reporting, according to certain embodiments. In particular embodiments, one or more steps of FIG. 8 may be performed by wireless device 110 described with respect to FIG. 6.

The method begins at step 812 where a wireless device (e.g., wireless device 110) receives an instruction to perform measurement reporting for a neighbor cell. The measurement reporting may include a CGI report. The neighbor cell RAT may be 5G NR.

At step 814, the wireless device may select a transceiver for performing the measurement reporting. The transceiver selection may be based on a RAT and/or frequency range of a neighbor cell. The wireless device may determine the selection, or the wireless device may receive an indication from a network node of which transceiver to select.

At step 816, the wireless device determines, based at least on a RAT of the neighbor cell and a frequency range of the neighbor cell, a measurement reporting timer value for performing the measurement reporting.

In some embodiments, determining the measurement reporting timer value comprises determining both a first measurement reporting timer value (e.g., 2 seconds) for a neighbor cell operating at a first frequency range (e.g., 450 Megahertz to 6 Gigahertz) and a second measurement reporting timer value (e.g., 16 seconds) for a neighbor cell operating at a second frequency range (e.g., 24.25 Gigahertz to 52.6 Gigahertz).

In particular embodiments, the wireless device comprises two or more transceivers. The method further comprises selecting one of the two or more transceivers for performing the measurement reporting. Determining the measurement reporting timer value is further based on the selected transceiver. Determining the measurement reporting timer value based on the selected transceiver may comprise determining the measurement reporting timer value based on a frequency range of the selected transceiver or on a RAT of the selected transceiver.

At step 818, the wireless device measures a radio signal of the neighbor cell during the time specified by the determined measurement reporting timer value. The wireless device may send a measurement report to the network node.

Modifications, additions, or omissions may be made to method 800 of FIG. 8. Additionally, one or more steps in the method of FIG. 8 may be performed in parallel or in any suitable order.

Figure 9:
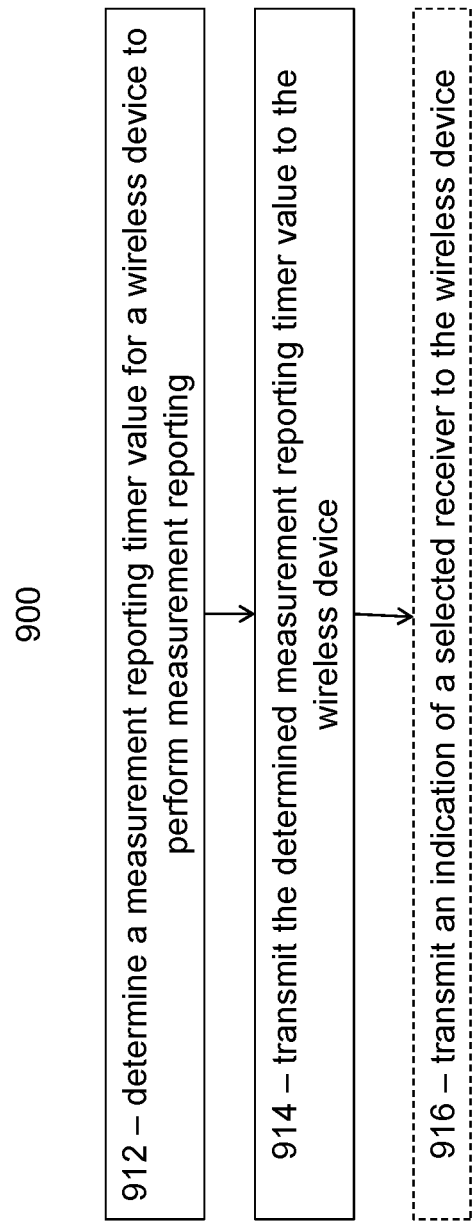
FIG. 9 is a flowchart illustrating an example method in a network node for measurement reporting, according to certain embodiments.

FIG. 9 is a flowchart illustrating an example method in a network node for measurement reporting, according to certain embodiments. In particular embodiments, one or more steps of FIG. 9 may be performed by network node 160 described with respect to FIG. 6.

The method begins at step 912 where a network node (e.g., network node 160) determines, based at least on a RAT of the neighbor cell and a frequency range of the neighbor cell, a measurement reporting timer value for performing the measurement reporting.

In some embodiments, determining the measurement reporting timer value comprises determining both a first measurement reporting timer value (e.g., 2 seconds) for a neighbor cell operating at a first frequency range (e.g., 450 Megahertz to 6 Gigahertz) and a second measurement reporting timer value (e.g., 16 seconds) for a neighbor cell operating at a second frequency range (e.g., 24.25 Gigahertz to 52.6 Gigahertz).

In particular embodiments, the wireless device comprises two or more transceivers. The method may further comprise selecting one of the two or more transceivers for performing the measurement reporting. Determining the measurement reporting timer value is further based on the selected transceiver. Determining the measurement reporting timer value based on the selected transceiver may comprise determining the measurement reporting timer value based on a frequency range of the selected transceiver or on a RAT of the selected transceiver.

At step 914, the network node transmits the determined measurement reporting timer value to the wireless device (e.g., wireless device 110).

At step 916, the network node may transmit an indication of a selected receiver to the wireless device. In some embodiments, step 916 may be combined with step 914 and both the reporting timer value and the selected receiver may be transmitted to the wireless device together.

Modifications, additions, or omissions may be made to method 900 of FIG. 9. Additionally, one or more steps in the method of FIG. 9 may be performed in parallel or in any suitable order.

Figure 10:
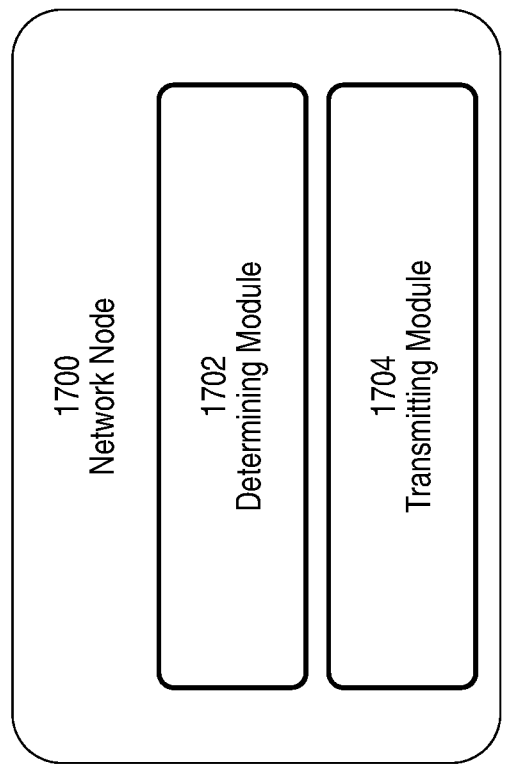
FIG. 10 illustrates an example wireless device and network node, according to certain embodiments.
Figure 10:
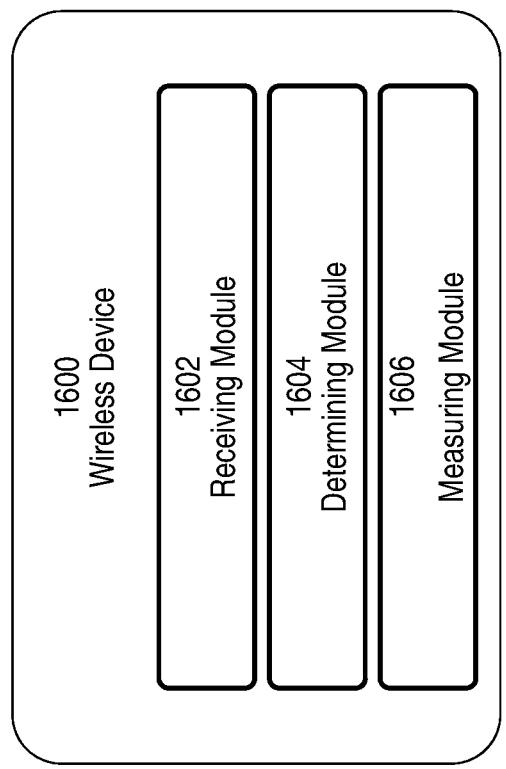

FIG. 10 illustrates a schematic block diagram of two apparatuses in a wireless network (for example, the wireless network illustrated in FIG. 6). The apparatuses include a wireless device and a network node (e.g., wireless device 110 and network node 160 illustrated in FIG. 6). Apparatuses 1600 and 1700 are operable to carry out the example methods described with reference to FIGS. 8 and 9, respectively, and possibly any other processes or methods disclosed herein. It is also to be understood that the methods of FIGS. 8 and 9 are not necessarily carried out solely by apparatus 1600 and/or apparatus 1700. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, measuring module 1606, and any other suitable units of apparatus 1600 to perform corresponding functions according one or more embodiments of the present disclosure. Similarly, the processing circuitry described above may be used to cause determining module 1702, transmitting module 1704 and any other suitable units of apparatus 1700 to perform corresponding functions according one or more embodiments of the present disclosure.

As illustrated in FIG. 10, apparatus 1600 includes receiving module 1602, determining module 1604, and measuring module 1606. In certain embodiments, receiving module 1602 may receive measurement reporting instructions and/or configuration from a network node according to any of the embodiments and examples described herein. Determining module 1604 may determine a measurement reporting timer value and/or select transceivers according to any of the embodiments and examples described herein. Measuring nodule 1606 may perform radio measurements according to any of the embodiments and examples described herein.

As illustrated in FIG. 10, apparatus 1700 includes determining module 1702 and transmitting module 1704. Determining module 1702 may determine a measurement reporting timer value and/or select transceivers according to any of the embodiments and examples described herein. Transmitting module 1706 may transmit measurement reporting timer values and/or selected transceivers to a wireless device according to any of the embodiments and examples described herein.

Figure 11:
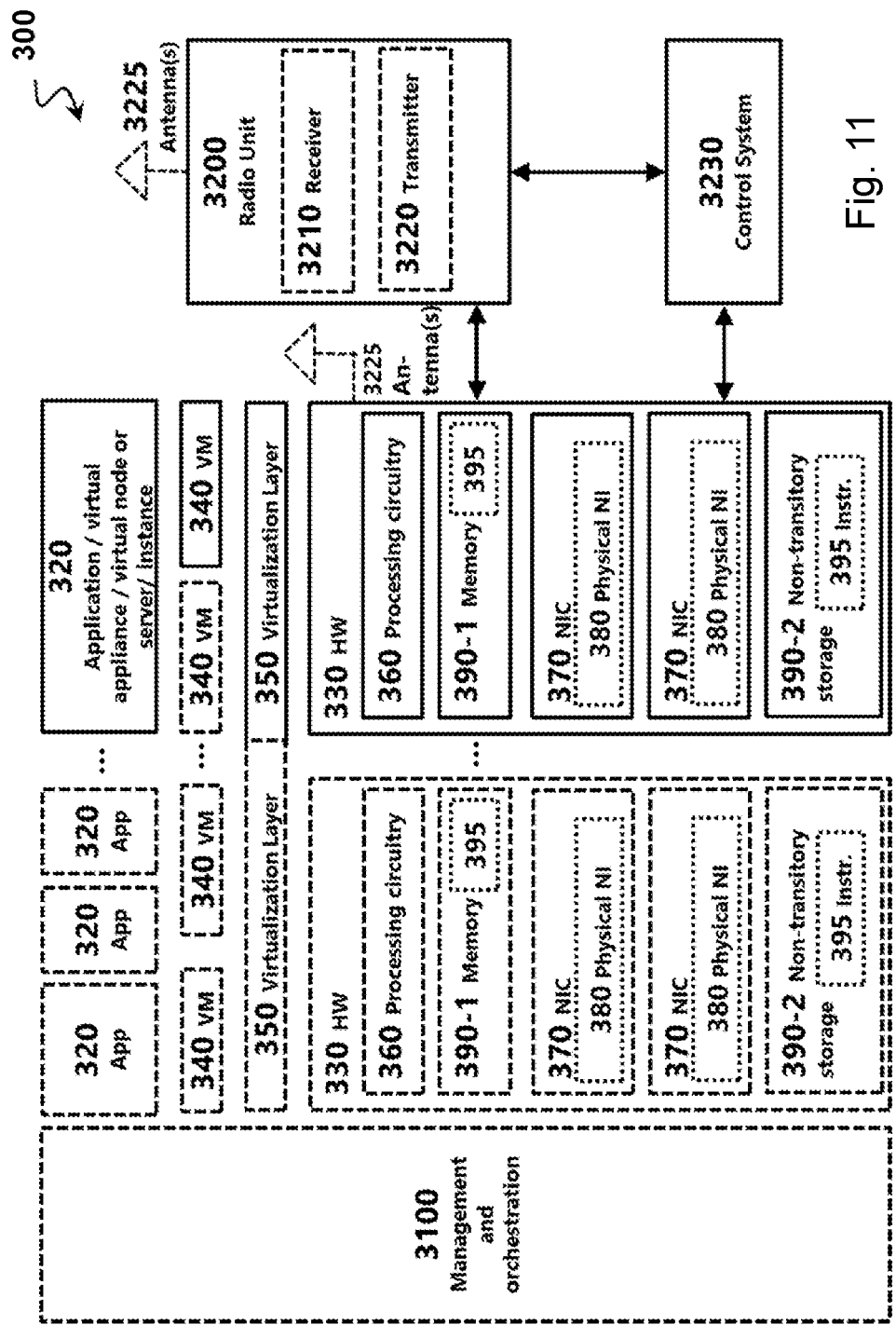
FIG. 11 illustrates an example virtualization environment, according to certain embodiments.

FIG. 11 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 11, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 11.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 12:
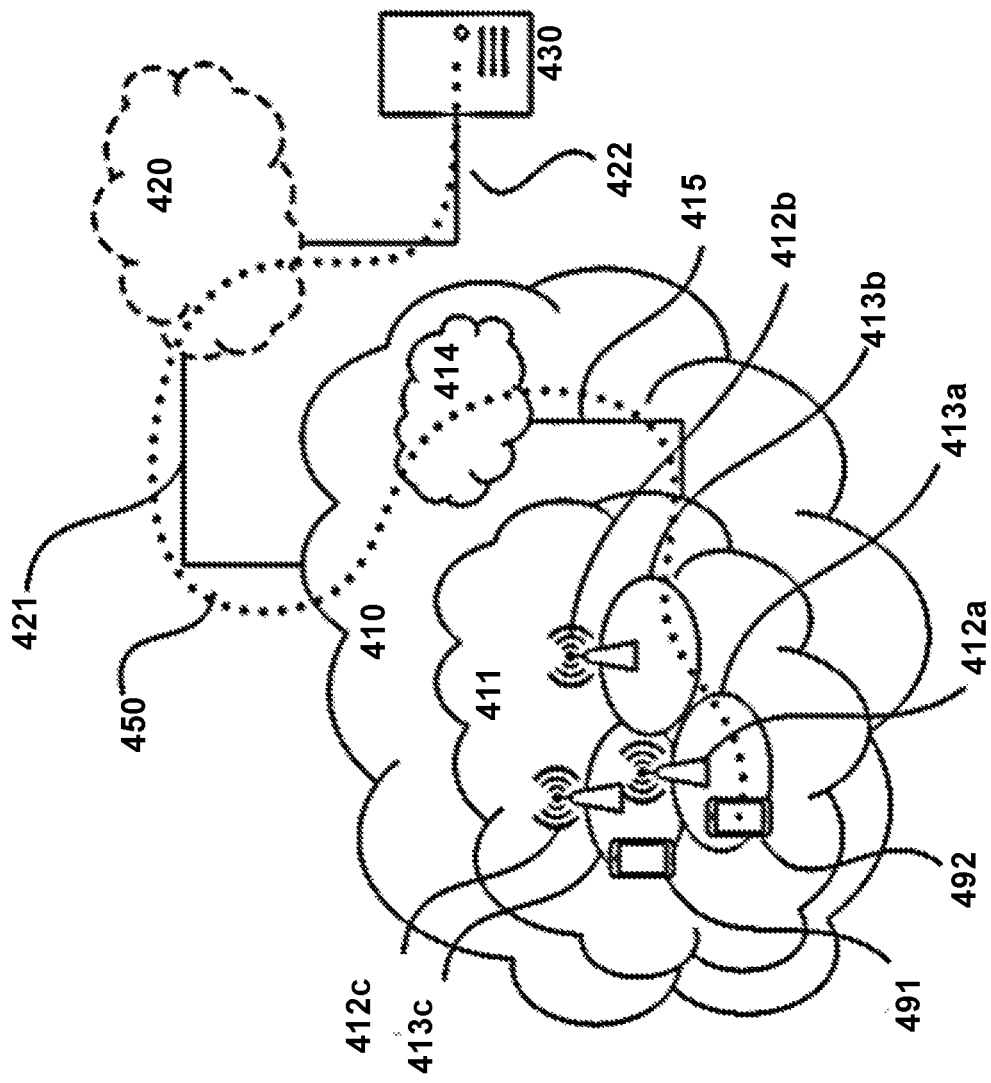
FIG. 12 illustrates an example telecommunication network connected via an intermediate network to a host computer, according to certain embodiments.

With reference to FIG. 12, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network: intermediate network 420, if any, may be a backbone network or the Internet: in particular, intermediate network 420 may comprise two or more sub-networks (not shown).

The communication system of FIG. 12 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 13:
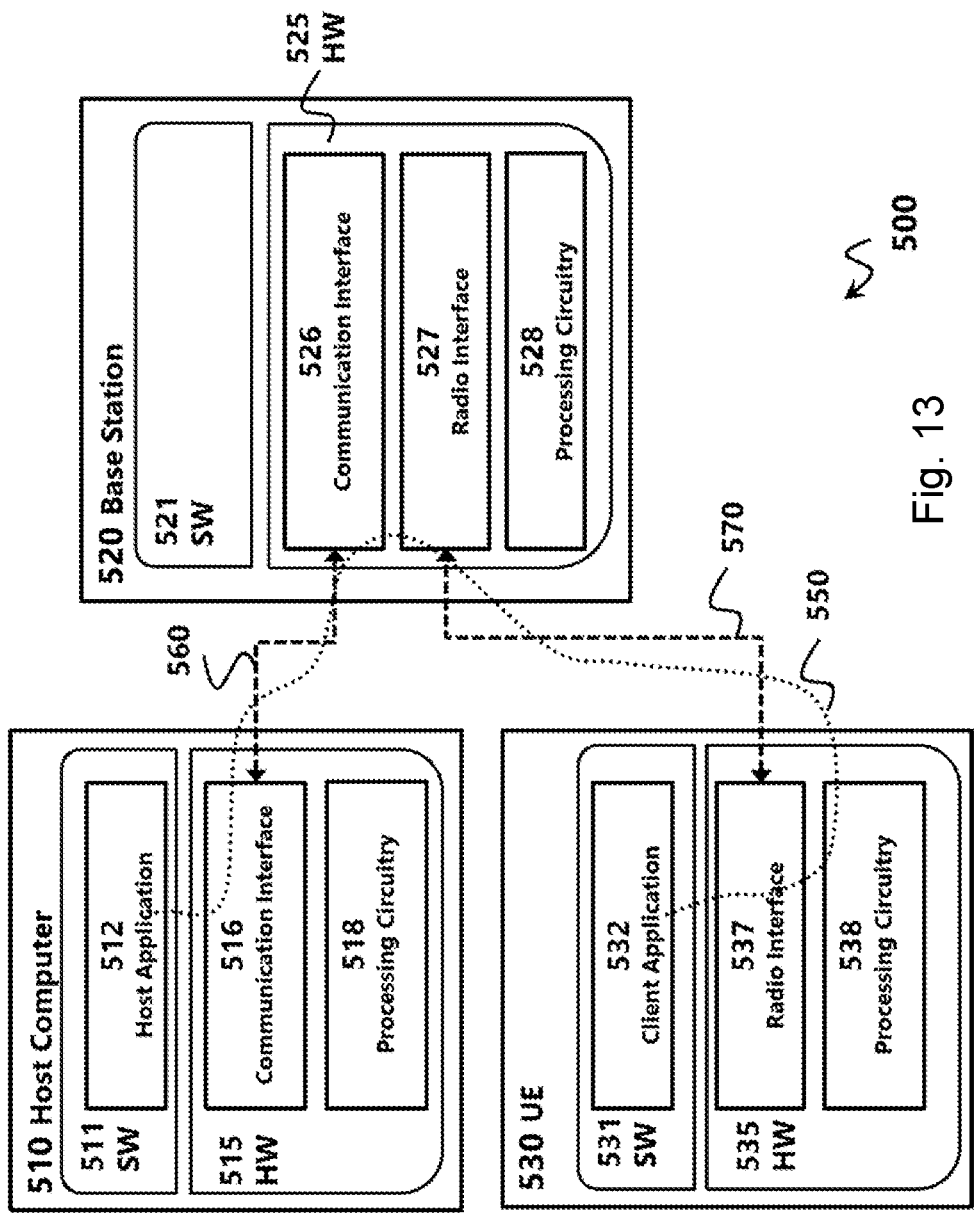
FIG. 13 illustrates an example host computer communicating via a base station with a user equipment over a partially wireless connection, according to certain embodiments.

FIG. 13 illustrates an example host computer communicating via a base station with a user equipment over a partially wireless connection, according to certain embodiments. Example implementations, in accordance with an embodiment, of the UE, base station and host computer discussed in the preceding paragraphs will now be described with reference to FIG. 13. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 13) served by base station 520. Communication interface 526 may be configured to facilitate connection 560 to host computer 510. Connection 560 may be direct, or it may pass through a core network (not shown in FIG. 13) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 13 may be similar or identical to host computer 430, one of base stations 412a, 412b, 412c and one of UEs 491, 492 of FIG. 12, respectively. This is to say, the inner workings of these entities may be as shown in FIG. 10 and independently, the surrounding network topology may be that of FIG. 12.

In FIG. 13, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes: the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.: the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 14:
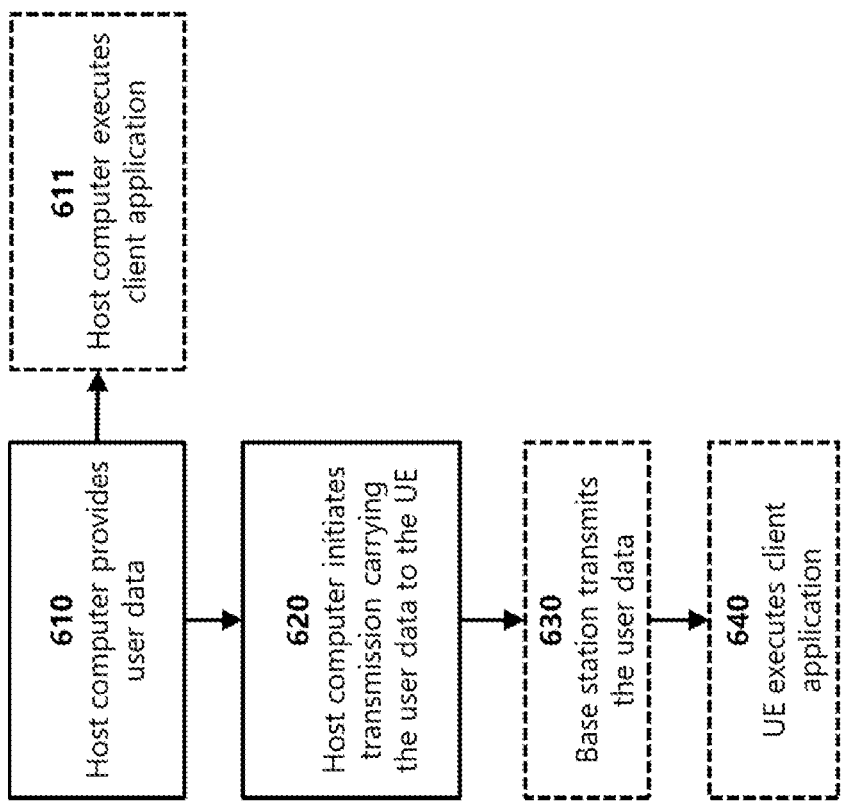
FIG. 14 is a flowchart illustrating a method implemented, according to certain embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 15:
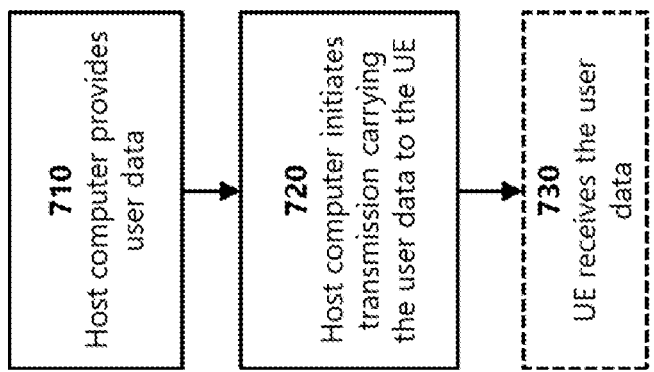
FIG. 15 is a flowchart illustrating a method implemented in a communication system, according to certain embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 16:
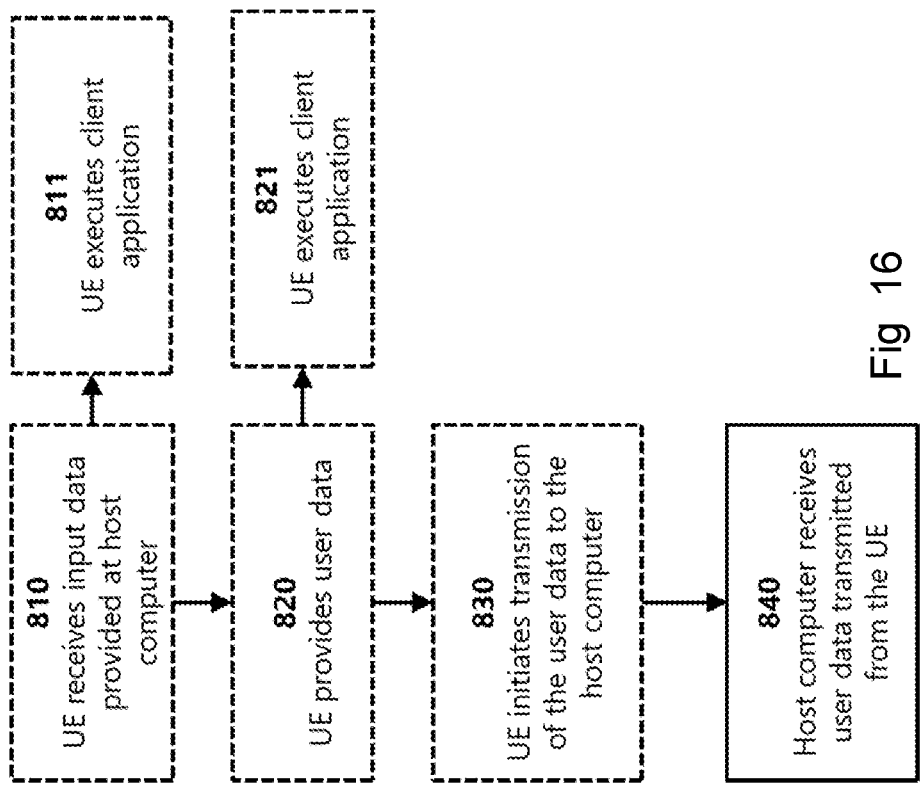
FIG. 16 is a flowchart illustrating another method implemented in a communication system, according to certain embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 17:
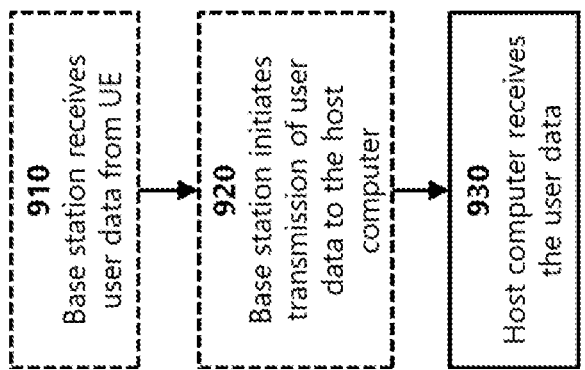
FIG. 17 is a flowchart illustrating another method implemented in a communication system, according to certain embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features and advantages of the enclosed embodiments will be apparent from the following description.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

ABBREVIATION EXPLANATION

1×RTT CDMA2000 1× Radio Transmission Technology
3GPP 3rd Generation Partnership Project
5G 5th Generation
5GC 5G Core
ABS Almost Blank Subframe
ARQ Automatic Repeat Request
AWGN Additive White Gaussian Noise
BCCH Broadcast Control Channel
BCH Broadcast Channel
BLER Block Error Rate
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix or Control Plane
CPICH Common Pilot Channel
CPICH Ec/No CPICH Received energy per chip divided by the power density in the band
CRS Cell Reference Signal
CQI Channel Quality information
C-RNTI Cell RNTI
CSI Channel State Information
DC Dual Connectivity
DCCH Dedicated Control Channel
DCI Downlink Control Information
DFTS OFDM Discrete Fourier Transform Spread OFDM
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
EN-DC EUTRAN-NR Dual Connectivity
eNB E-UTRAN NodeB
EPC Evolved Packet Core
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
GPRS General Packet Radio Service
GSM Global System for Mobile communication
HARQ Hybrid Automatic Repeat Request
HO Handover
HSPA High Speed Packet Access
HRPD High Rate Packet Data
IR-HARQ Incremental Redundancy HARQ
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MCG Master Cell Group (related to master node in dual connectivity)
MDT Minimization of Drive Tests
MIB Master Information Block
MIMO Multiple Input Multiple Output
MME Mobility Management Entity
MN Master Node
MR-DC Multiple RAT Dual Connectivity
MSC Mobile Switching Center
NG Next Generation
NPDCCH Narrowband Physical Downlink Control Channel
NR New Radio
NSA Non-Stand-alone NR OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCI Physical Cell Identity
PCFICH Physical Control Format Indicator Channel
PCRF Policy and Charging Rules Function
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RF Radio Frequency
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SA Stand-alone NR
SCH Synchronization Channel
SCell Secondary Cell
SDU Service Data Unit
SFN System Frame Number
SGW Serving Gateway
SI System Information
SIB System Information Block
SIB1 System Information Block Type1
SN Secondary Node
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
V2X Vehicle to everything
VOIP Voice over Internet Protocol
WCDMA Wide CDMA
WLAN Wide Local Area Network

The invention claimed is:

1. A method performed by a wireless device for measurement reporting, the method comprising:
receiving an instruction to perform measurement reporting for a neighbor cell;
receiving, from a network, a transceiver selection indication indicating which transceiver should be used for performing the measurement reporting;
selecting, based at least on the transceiver selection indication and a dual connectivity configuration of the wireless device, one of two or more transceivers for performing the measurement reporting, wherein the wireless device comprises the two or more transceivers;
determining, based at least on a radio access technology (RAT) of the neighbor cell, the selected transceiver, and a frequency range of the neighbor cell, a measurement reporting timer value for performing the measurement reporting, wherein the measurement reporting timer value is determined further based at least on a capability of the selected transceiver to retrieve the measurement reporting timer value when the neighbor cell is a non-standalone (NSA) cell not broadcasting a system information block type 1 (SIB1); and
measuring a radio signal of the neighbor cell during a time specified by the determined measurement reporting timer value;
wherein determining the measurement reporting timer value comprises determining both a first measurement reporting timer value for a neighbor cell operating at a first frequency range and a second measurement reporting timer value for a neighbor cell operating at a second frequency range; and
wherein the first frequency range comprises a 450 Megahertz to 6 Gigahertz range, the value of the first measurement reporting timer is 2 seconds, the second frequency range comprises a 24.25 Gigahertz to 52.6 Gigahertz range, and the value of the second measurement reporting timer is 16 seconds.

2. The method of claim 1, wherein the measurement reporting comprises a cell global identifier (CGI) report.

3. The method of claim 1, wherein the neighbor cell RAT is fifth generation (5G) new radio (NR).

4. The method of claim 1, wherein determining the measurement reporting timer value based on the selected transceiver comprises determining the measurement reporting timer value based on a frequency range of the selected transceiver.

5. The method of claim 1, wherein determining the measurement reporting timer value based on the selected transceiver comprises determining the measurement reporting timer value based on a RAT of the selected transceiver.

6. A wireless device capable of measurement reporting, the wireless device comprising processing circuitry operable to:
receive an instruction to perform measurement reporting for a neighbor cell;
receive, from a network, a transceiver selection indication indicating which transceiver should be used for performing the measurement reporting;
select, based at least on the transceiver selection indication and a dual connectivity configuration of the wireless device, one of two or more transceivers for performing the measurement reporting, wherein the wireless device comprises the two or more transceivers;

determine, based at least on a radio access technology (RAT) of the neighbor cell, the selected transceiver, and a frequency range of the neighbor cell, a measurement reporting timer value for performing the measurement reporting, wherein the measurement reporting timer value is determined further based at least on a capability of the selected transceiver to retrieve the measurement reporting timer value when the neighbor cell is a non-standalone (NSA) cell not broadcasting a system information block type 1 (SIB1); and measure a radio signal of the neighbor cell during a time specified by the determined measurement reporting timer value;

wherein the processing circuitry is operable to determine the measurement reporting timer value by determining both a first measurement reporting timer value for a neighbor cell operating at a first frequency range and a second measurement reporting timer value for a neighbor cell operating at a second frequency range; and wherein the first frequency range comprises a 450 Megahertz to 6 Gigahertz range, the value of the first measurement reporting timer is 2 seconds, the second frequency range comprises a 24.25 Gigahertz to 52.6 Gigahertz range, and the value of the second measurement reporting timer is 16 seconds.

7. The wireless device of claim 6, wherein the measurement reporting comprises a cell global identifier (CGI) report.

8. The wireless device of claim 6, wherein the neighbor cell RAT is fifth generation (5G) new radio (NR).

9. The wireless device of claim 6, wherein the processing circuitry is operable to determine the measurement reporting timer value based on the selected transceiver by determining the measurement reporting timer value based on a frequency range of the selected transceiver.

10. The wireless device of claim 6, wherein the processing circuitry is operable to determine the measurement reporting timer value based on the selected transceiver by determining the measurement reporting timer value based on a RAT of the selected transceiver.

11. A method for use in a network node for measurement reporting, the method comprising:

transmitting, to a wireless device, a transceiver selection indication indicating which transceiver should be used for performing a measurement reporting;

determining that one of two or more transceivers is selected for performing the measurement reporting based at least on the transceiver selection indication and a dual connectivity configuration of the wireless device, wherein the wireless device comprises the two or more transceivers;

determining, based at least on a radio access technology (RAT) of a neighbor cell, the selected transceiver, and a frequency range of the neighbor cell, a measurement reporting timer value for the wireless device to perform measurement reporting, wherein the measurement reporting timer value is determined further based at least on a capability of the selected transceiver to retrieve the measurement reporting timer value when the neighbor cell is a non-standalone (NSA) cell not broadcasting a system information block type 1 (SIB1); and transmitting the determined measurement reporting timer value to the wireless device;

wherein determining the measurement reporting timer value comprises determining both a first measurement reporting timer value for a neighbor cell operating at a first frequency range and a second measurement reporting timer value for a neighbor cell operating at a second frequency range; and wherein the first frequency range comprises a 450 Megahertz to 6 Gigahertz range, the value of the first measurement reporting timer is 2 seconds, the second frequency range comprises a 24.25 Gigahertz to 52.6 Gigahertz range, and the value of the second measurement reporting timer is 16 seconds.

12. A network node capable of measurement reporting, the network node comprising processing circuitry operable to:

transmit, to a wireless device, a transceiver selection indication indicating which transceiver should be used for performing a measurement reporting;

determine that one of two or more transceivers is selected for performing the measurement reporting based at least on the transceiver selection indication and a dual connectivity configuration of the wireless device, wherein the wireless device comprises the two or more transceivers;

determine, based at least on a radio access technology (RAT) of a neighbor cell, the selected transceiver, and a frequency range of the neighbor cell, a measurement reporting timer value for the wireless device to perform measurement reporting, wherein the measurement reporting timer value is determined further based at least on a capability of the selected transceiver to retrieve the measurement reporting timer value when the neighbor cell is a non-standalone (NSA) cell not broadcasting a system information block type 1 (SIB1); and transmit the determined measurement reporting timer value to the wireless device;

wherein the processing circuitry is operable to determine the measurement reporting timer value by determining both a first measurement reporting timer value for a neighbor cell operating at a first frequency range and a second measurement reporting timer value for a neighbor cell operating at a second frequency range; and wherein the first frequency range comprises a 450 Megahertz to 6 Gigahertz range, the value of the first measurement reporting timer is 2 seconds, the second frequency range comprises a 24.25 Gigahertz to 52.6 Gigahertz range, and the value of the second measurement reporting timer is 16 seconds.

13. The network node of claim 12, wherein the measurement reporting comprises a cell global identifier (CGI) report.

14. The network node of claim 12, wherein the neighbor cell RAT is fifth generation (5G) new radio (NR).

15. The network node of claim 12, wherein the processing circuitry is further operable to transmit an indication of the selected receiver to the wireless device.

16. The network node of claim 15, wherein the processing circuitry is operable to determine the measurement reporting timer value based on the selected transceiver by determining the measurement reporting timer value based on a frequency range of the selected transceiver.

17. The network node of claim 15, wherein the processing circuitry is operable to determine the measurement reporting timer value based on the selected transceiver by determining the measurement reporting timer value based on a RAT of the selected transceiver.

\* \* \* \* \*

UNITED STATES PATENT AND TRADEMARK OFFICE
CERTIFICATE OF CORRECTION

PATENT NO. : 12,063,530 B2
APPLICATION NO. : 17/049096
DATED : August 13, 2024
INVENTOR(S) : Moosavi et al.

It is certified that error appears in the above-identified patent and that said Letters Patent is hereby corrected as shown below:

On the Title Page

Item (57), under "ABSTRACT", in Column 2, Line 4, delete "cell:" and insert -- cell; --, therefor.

Item (56), under "OTHER PUBLICATIONS", in Column 2, Line 7, delete "Internatonal" and insert -- International --, therefor.

In the Drawings

In Fig. 4, Sheet 4 of 15, for Tag "420", in Line 1, delete "Transciever" and insert -- Transceiver --, therefor.

In Fig. 4, Sheet 4 of 15, for Tag "400", in Line 1, delete "Pre-configuer/configure" and insert -- Pre-configured/configured --, therefor.

In Fig. 17, Sheet 15 of 15, delete "Fig 17" and insert -- Fig. 17 --, therefor.

In Fig. 16, Sheet 15 of 15, delete "Fig 16" and insert -- Fig. 16 --, therefor.

In the Specification

In Column 1, Line 7, delete "May 17, 2019" and insert -- May 7, 2019 --, therefor.

In Column 1, Line 50, delete "identifier" and insert -- identity --, therefor.

In Column 1, Line 60, delete "cell reference signal" and insert -- cell specific reference signal --, therefor.

In Column 2, Line 3, delete "identifier" and insert -- identity --, therefor.

Signed and Sealed this
Sixth Day of May, 2025

Coke Morgan Stewart
*Acting Director of the United States Patent and Trademark Office*

CERTIFICATE OF CORRECTION (continued)
U.S. Pat. No. 12,063,530 B2

In Column 2, Line 19, delete "identifier" and insert -- identity --, therefor.

In Column 3, Line 35, delete "(EPC)." and insert -- (CN). --, therefor.

In Column 4, Line 50, delete "identifier" and insert -- identity --, therefor.

In Column 5, Line 31, delete "cell:" and insert -- cell; --, therefor.

In Column 5, Line 34, delete "reporting:" and insert -- reporting; --, therefor.

In Column 5, Line 64, delete "cell:" and insert -- cell; --, therefor.

In Column 6, Line 1, delete "reporting:" and insert -- reporting; --, therefor.

In Column 6, Line 37, delete "reporting:" and insert -- reporting; --, therefor.

In Column 7, Line 1, delete "reporting:" and insert -- reporting; --, therefor.

In Column 8, Line 12, delete "retrieval:" and insert -- retrieval; --, therefor.

In Column 8, Line 14, delete "options:" and insert -- options; --, therefor.

In Column 8, Line 16, delete "device:" and insert -- device; --, therefor.

In Column 8, Line 19, delete "embodiments:" and insert -- embodiments; --, therefor.

In Column 8, Line 21, delete "embodiments:" and insert -- embodiments; --, therefor.

In Column 8, Line 23, delete "network:" and insert -- network; --, therefor.

In Column 8, Line 25, delete "embodiments:" and insert -- embodiments; --, therefor.

In Column 8, Line 28, delete "embodiments:" and insert -- embodiments; --, therefor.

In Column 8, Line 31, delete "embodiments:" and insert -- embodiments; --, therefor.

In Column 8, Line 33, delete "embodiments:" and insert -- embodiments; --, therefor.

In Column 8, Line 35, delete "embodiments:" and insert -- embodiments; --, therefor.

In Column 8, Line 38, delete "embodiments:" and insert -- embodiments; --, therefor.

In Column 8, Lines 41-42, delete "embodiments:" and insert -- embodiments; --, therefor.

In Column 8, Line 44, delete "embodiments:" and insert -- embodiments; --, therefor.

CERTIFICATE OF CORRECTION (continued)
U.S. Pat. No. 12,063,530 B2

In Column 8, Lines 46-47, delete "embodiments:" and insert -- embodiments; --, therefor.

In Column 9, Line 5, delete "identifier" and insert -- identity --, therefor.

In Column 11, Line 14, delete "identifier" and insert -- identity --, therefor.

In Column 11, Line 40, delete "my" and insert -- may --, therefor.

In Column 11, Line 47, delete "my" and insert -- may --, therefor.

In Column 11, Line 65, delete "standards:" and insert -- standards; --, therefor.

In Column 11, Line 66, delete "standards:" and insert -- standards; --, therefor.

In Column 14, Line 5, delete "units" and insert -- units. --, therefor.

In Column 16, Line 28, delete "(VOIP)" and insert -- (VoIP) --, therefor.

In Column 16, Line 36, delete "(CPE)." and insert -- (CPE), --, therefor.

In Column 16, Line 44, delete "(IOT)" and insert -- (IoT) --, therefor.

In Column 16, Line 51, delete "(NB-IOT)" and insert -- (NB-IoT) --, therefor.

In Column 16, Lines 54-55, delete "etc.) personal" and insert -- etc.), personal --, therefor.

In Column 17, Line 28, delete "112:" and insert -- 112; --, therefor.

In Column 18, Line 66, delete "screen:" and insert -- screen; --, therefor.

In Column 19, Line 41, delete "source:" and insert -- source; --, therefor.

In Column 20, Line 15, delete "NB-IOT" and insert -- NB-IoT --, therefor.

In Column 20, Lines 22-23, delete "interchangeable." and insert -- interchangeably. --, therefor.

In Column 20, Line 53, delete "software:" and insert -- software; --, therefor.

In Column 24, Line 54, delete "according one" and insert -- according to one --, therefor.

In Column 24, Line 58, delete "according one" and insert -- according to one --, therefor.

In Column 27, Line 24, delete "network:" and insert -- network; --, therefor.

In Column 27, Line 25, delete "Internet:" and insert -- Internet; --, therefor.

CERTIFICATE OF CORRECTION (continued)
U.S. Pat. No. 12,063,530 B2

In Column 29, Line 26, delete "passes:" and insert -- passes; --, therefor.

In Column 29, Line 32, delete "etc.:" and insert -- etc.; --, therefor.

In Column 31, Line 67, delete "CC Carrier Component" and insert -- CC Component Carrier --, therefor.

In Column 32, Line 2, delete "CDMA Code Division Multiplexing Access" and insert -- CDMA Code-Division Multiple Access --, therefor.

In Column 32, Line 3, delete "Identifier" and insert -- Identity --, therefor.

In Column 32, Line 9, delete "Cell Reference Signal" and insert -- Cell Specific Reference Signal --, therefor.

In Column 32, Line 67, delete "NSA Non-Stand-alone NR" and insert -- NSA Non-Standalone --, therefor.

In Column 33, Line 14, delete "Profile Delay Profile" and insert -- Power Delay Profile --, therefor.

In Column 33, Line 19, delete "Precoder" and insert -- Precoding --, therefor.

In Column 33, Line 31, delete "Management" and insert -- Monitoring --, therefor.

In Column 33, Line 55, delete "Self Optimized Network" and insert -- Self-Organizing Network --, therefor.

In Column 34, Line 4, delete "VOIP" and insert -- VoIP --, therefor.

In Column 34, Line 5, delete "Wide CDMA" and insert -- Wideband CDMA --, therefor.

In Column 34, Line 6, delete "Wide Local Area Network" and insert -- Wireless Local-Area Network --, therefor.

In the Claims

In Column 34, Line 46, in Claim 2, delete "identifier" and insert -- identity --, therefor.

In Column 35, Line 30, in Claim 7, delete "identifier" and insert -- identity --, therefor.

In Column 36, Line 55, in Claim 13, delete "identifier" and insert -- identity --, therefor.